United States Patent
Huff et al.

(10) Patent No.: US 8,699,514 B2
(45) Date of Patent: Apr. 15, 2014

(54) MULTI-RATE MAC TO PHY INTERFACE

(75) Inventors: Gary S. Huff, Laguna Hills, CA (US); Howard A. Baumer, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 304 days.

(21) Appl. No.: 12/007,343

(22) Filed: Jan. 9, 2008

(65) Prior Publication Data

US 2008/0170586 A1    Jul. 17, 2008

Related U.S. Application Data (60) Provisional application No. 60/880,006, filed on Jan. 12, 2007.

(51) Int. Cl.
*H04J 3/16* (2006.01)
*H04J 3/22* (2006.01)

(52) U.S. Cl.
USPC .......................................................... 370/465

(58) Field of Classification Search
None
See application file for complete search history.

(56) References Cited

U.S. PATENT DOCUMENTS

| | | |
|---|---|---|
| 4,627,070 A | 12/1986 | Champlin et al. |
| 4,821,174 A | 4/1989 | Webb et al. |
| 4,833,605 A | 5/1989 | Terada et al. |
| 4,833,695 A | 5/1989 | Greub |
| 4,967,201 A | 10/1990 | Rich, III |
| 5,594,908 A | 1/1997 | Hyatt |
| 5,617,547 A | 4/1997 | Feeney et al. |

(Continued)

FOREIGN PATENT DOCUMENTS

| | | |
|---|---|---|
| GB | 1316462 A | 5/1973 |
| WO | WO 95/15630 A1 | 6/1995 |
| WO | WO 98/36609 A1 | 8/1998 |

OTHER PUBLICATIONS

International Search Report Issued Dec. 14, 2004 for International Application No. PCT/US03/34234, 5 pages.

(Continued)

*Primary Examiner* — Suk Jin Kang
(74) *Attorney, Agent, or Firm* — Sterne Kessler Goldstein & Fox PLLC (57) ABSTRACT

A method and system for a multi-rate Media Access Control layer (MAC) to Physical layer (PHY) interface is provided. The method to provide a multi-rate Media Access Control layer (MAC) interface comprises receiving a first set of signals, sampling the first set of signals to determine a type of interface to be used to transmit or receive the first set of signals or a subset of the first set of signals, generating a select signal indicating type of interface to be used based on the sampling step and transmitting the first set of signals or a subset of the first set of signals using the interface indicated by the select signal. The method to provide a multi-rate Physical layer (PHY) interface comprises receiving a select signal from a Physical layer (PHY) layer indicating data rate of a first set of signals, selecting a first interface and turning off the second interface if the select signal indicates the first interface is to be used, selecting the second interface and turning off the first interface if the select signal indicates the second interface is to be used and transmitting the first set of signals using the second interface or a subset of the first set of signals using the first interface based on the select signal.

18 Claims, 8 Drawing Sheets

(56) References Cited

U.S. PATENT DOCUMENTS

| | | | |
|---|---|---|---|
| 5,726,991 A | 3/1998 | Chen et al. | |
| 5,751,699 A | 5/1998 | Radke | |
| 5,793,990 A | 8/1998 | Jirgal et al. | |
| 5,908,468 A | 6/1999 | Hartmann | |
| 5,933,021 A | 8/1999 | Mohd | |
| 5,954,811 A | 9/1999 | Garde | |
| 6,081,570 A | 6/2000 | Ghuman et al. | |
| 6,108,801 A | 8/2000 | Malhotra et al. | |
| 6,110,314 A | 8/2000 | Nix et al. | |
| 6,137,734 A | 10/2000 | Schoner et al. | |
| 6,140,956 A | 10/2000 | Hillman et al. | |
| 6,215,412 B1 | 4/2001 | Franaszek et al. | |
| 6,259,693 B1 | 7/2001 | Ganmukhi et al. | |
| 6,317,804 B1 | 11/2001 | Levy et al. | |
| 6,438,717 B1 | 8/2002 | Butler et al. | |
| 6,483,849 B1 | 11/2002 | Bray et al. | |
| 6,721,313 B1 | 4/2004 | Van Duyne | |
| 7,032,139 B1 | 4/2006 | Iryami et al. | |
| 7,035,228 B2 | 4/2006 | Baumer | |
| 7,068,650 B1 | 6/2006 | Bachar et al. | |
| 7,280,549 B2 | 10/2007 | Regev et al. | |
| 7,355,987 B2* | 4/2008 | Baumer | 370/258 |
| 7,356,047 B1* | 4/2008 | Mahalawat et al. | 370/469 |
| 7,376,146 B2 | 5/2008 | Beverly et al. | |
| 7,450,529 B2 | 11/2008 | Amirichimeh et al. | |
| 7,450,530 B2 | 11/2008 | Amirichimeh et al. | |
| 8,023,436 B2 | 9/2011 | Baumer | |
| 8,094,590 B2 | 1/2012 | Amirichimeh et al. | |
| 2001/0012288 A1 | 8/2001 | Yu | |
| 2001/0015664 A1 | 8/2001 | Taniguchi | |
| 2001/0017595 A1 | 8/2001 | Cliff et al. | |
| 2001/0021953 A1 | 9/2001 | Nakashima | |
| 2002/0054569 A1 | 5/2002 | Morikawa | |
| 2003/0009307 A1 | 1/2003 | Mejia et al. | |
| 2003/0048781 A1 | 3/2003 | Pierson | |
| 2003/0120791 A1 | 6/2003 | Weber et al. | |
| 2003/0172332 A1 | 9/2003 | Rearick et al. | |
| 2003/0179709 A1* | 9/2003 | Huff | 370/248 |
| 2003/0179710 A1* | 9/2003 | Huff | 370/248 |
| 2003/0214974 A1 | 11/2003 | Beverly et al. | |
| 2003/0235204 A1 | 12/2003 | Azevedi et al. | |
| 2004/0028164 A1* | 2/2004 | Jiang et al. | 375/371 |
| 2004/0083077 A1 | 4/2004 | Baumer et al. | |
| 2004/0088443 A1 | 5/2004 | Tran et al. | |
| 2004/0117698 A1 | 6/2004 | Tran et al. | |
| 2004/0141497 A1 | 7/2004 | Amirichimeh et al. | |
| 2004/0141531 A1 | 7/2004 | Amirichimeh et al. | |
| 2005/0190690 A1 | 9/2005 | Tran | |
| 2005/0259685 A1* | 11/2005 | Chang et al. | 370/469 |
| 2005/0271064 A1* | 12/2005 | Chang et al. | 370/397 |
| 2006/0034334 A1* | 2/2006 | Biederman | 370/477 |
| 2006/0250985 A1 | 11/2006 | Baumer | |
| 2007/0168770 A1* | 7/2007 | Fan et al. | 714/704 |
| 2007/0248118 A1* | 10/2007 | Bishara et al. | 370/469 |
| 2008/0010661 A1* | 1/2008 | Kappler et al. | 725/120 |
| 2008/0049788 A1* | 2/2008 | McClellan | 370/468 |
| 2008/0069014 A1* | 3/2008 | Powell et al. | 370/278 |
| 2008/0069052 A1* | 3/2008 | Mezer et al. | 370/332 |
| 2008/0069144 A1* | 3/2008 | Yu et al. | 370/476 |
| 2008/0186996 A1* | 8/2008 | Powell et al. | 370/448 |
| 2012/0239846 A1 | 9/2012 | Baumer | |

OTHER PUBLICATIONS

Alaska Quad-Port Gigabit Ethernet Over Copper Transceivers, from http://www.marvell.com/products/transceivers/quadport/ . . . , 1 page, printed May 8, 2007.

Alaska X10 Gigabit Ethernet Alaska Gigabit Ethernet Fast Ethernet Physical Layer (PHY) Transceiver Families Provide a Full Range of Ethernet Transceiver Solutions for the Broadband Communications Industry, from http://www.nuhorizons.com/FeaturedProducts/Volume3/Marvell/phy_transceiver.asp, 4 pages, Copyright 2007, printed May 8, 2007.

Cisco Search: Results for "cdl" within "News@Cisco", from http://www.cisco.com/pcgi-bin/search/search.pl, Copyright 1992-2003, printed Jul. 29, 2003.

Industry Breakthrough: Marvell Announces the First Quad-Port Transceiver to Support Both Copper and Fiber-Optic Gigabit Ethernet Interfaces, from Business Wire at www.encyclopedia.com/printable/aspx?id=1G1:68912211, 4 pages, Jan. 9, 2001, printed May 8, 2007.

David Maliniak (ed.), Bel's integrated connector modules support Marvell's Alaska quad Gigabit Ethernet transceiver, from http://www.electronicsweb.com/Content/news/ . . . , 1 page, Dec. 14, 2000, printed May 8, 2007.

Marvell Gets Small, from http://www.lightreading.com/document.asp?doc_id=12004&print=true, 1 page, Feb. 19, 2002, printed May 8, 2007.

Marvell Introduces the Industry's Smallest Quad-Port Gigabit Transceiver Device, Enabling Ultra High Port Density Enterprise Switching Systems, from http://www.marvell.com/press/pressNewsDisplay.do?releaseID-41, 3 pages, Feb. 19, 2002, printed May 8, 2007.

Ed Turner, David Law, Sep. 17-19, 2001, "IEEE P802.3ae MDC/MDIO", http://www.Ieee802.org/3/efm/public/sep01/turner.sub.--1.sub.--0901.pdf.

Q&A: Hiroshi Suzuki on Extending Ethernet Beyond the LAN, from http://newsroom.cisco.com/dlls/innovators/optical/hiroshi_suzuki_qa.html, 3 pages, Copyright 1992-2003, printed Jul. 29, 2003.

IEEE Std. 802.3, Part 3: Carrier Sense Multiple Access with Collision Detection (CSMA/CD) access method and physical layer specifications, Section Two, pp. 9-55, Copyright 2002.

IEEE Std. 802.3, Part 3: Carrier Sense Multiple Access with Collision Detection (CSMA/CD) access method and physical layer specifications, Section Four, pp. 9-152, Copyright 2005.

Cisco Systems, Hiroshi Suzuki: Taking Ethernet Beyond the LAN, http://newsroom.cisco.com/dlls/innovators/optical/hiroshi_suzuki_profile.html.

Cisco Systems, Q&A: Hiroshi Suzuki on Extending Ethernet Beyond the LAN, http://newsroom.cisco.com/dlls/innovators/optical/hiroshi_suzuki_qa.html.

Cisco Systems, Innovators Profiles, http://newsroom.cisco.com/dlls/innovators/inn_profiles.html.

Cisco Systems, Optical, http://newsroom.cisco.com/dlls/innovatros/optical/.

Cisco Systems, Cisco Systems ad Aretae Interactive Launch Internet Powered Property (IP2), http://newroom.cisco.com/dlls/global/asiapac/news/2000/pr_07-25.html.

"Broadcom Announces the First 0.13-micron CMOS Multi-Rate Gigabit Octal Serializers/Deserializers" [online], Broadcom Press Release, Oct. 29, 2002 [retrieved on Jul. 16, 2003]. Retrieved from the Internet: <URL: http://www.broadcom.com/cgi-bin/pr/prps.cgi?pr_id=PR021029> (5 pages).

BCM8040 8-Channel Multi-rate 1.0-3.2-GBPS Retimer Switch [online], Broadcom Products Site Guide [retrieved on Jul. 16, 2003]. Retrieved from the Internet: <URL: http://www.broadcom.com/products/8040.html> (2 pages).

8-Channel Multi-Rate CMOS Retimer with Full Redundancy [online], BCM8040 Product Brief, Broadcom Corporation (2002) [retrieved on Jul. 16, 2003]. Retrieved from the Internet:<URL: http://www.broadcom.com/products/8040.html> (2 pages).

BCM8020 8-Channel Multi-rate 1.0-3.2-GBPS Transceiver [online], Broadcom Products Site Guide [retrieved on Jul. 16, 2003]. Retrieved from the Internet: <URL: http://www.broadcom.com/products/8020.html> (2 pages).

8-Channel Multi-Rate CMOS Transceiver with Full Redundancy [online], BCM8020 Product Brief, Broadcom Corporation (2002) [retrieved on Jul. 16, 2003]. Retrieved from the Internet: <URL: http://www.broadcom.com/products/8020.html> (2 pages).

BCM8021 4-Channel Multi-rate 1.0-3.2-GBPS Transceiver with High-Speed Redundancy [online], Broadcom Products Site Guide [retrieved on Jul. 16, 2003]. Retrieved from the Internet: <URL: http://www.broadcom.com/products/8021.html> (2 pages).

(56) References Cited

OTHER PUBLICATIONS

4-Channel Multirate 1.0-3.2-GBPS Transceiver with High-Speed Redundancy [online], BCM8021 Product Brief, Broadcom Corporation (2002) [retrieved on Jul. 16, 2003]. Retrieved from the Internet: <URL: http://www.broadcom.com/products/8021.html> (2 pages).

Broadcom Announces the Industry's First 0.13-micron CMOS Advanced Transciver Solution with Signal Conditioning for Low-Cost 10-Gigabit Over Copper Links [online], Broadcom Press Release, Apr. 29, 2003 [retrieved on Jul. 16, 2003]. Retrieved from the Internet: <URL: http://www.broadcom.com/cgi-bin/pr/prps.cgi?pr_id=PR030429A> (4 pages).

European Supplmentary Search Report for European Patent Application No. 03779391.6, European Patent Office, Munich, Germany, issued May 25, 2010 (search completed on May 12, 2010), 5 pages.

European Search Report directed toward EP Application No. 13 00 0556.4, European Patent Office, Munich, Germany, dated Apr. 16, 2013, 3 pages.

Summons to attend oral proceedings pursuant to Rule 115(1) EPC, dated Sep. 21, 2012, for European Application No. 03779391.6, 5 pages.

\* cited by examiner

MULTI-RATE MAC TO PHY INTERFACE

CROSS-REFERENCE TO RELATED APPLICATIONS

This application claims the benefit of U.S. Provisional Application No. 60/880,006 filed Jan. 12, 2007, which is incorporated herein by reference in its entirety.

BACKGROUND OF THE INVENTION

1. Field of the Invention

The present invention generally relates to networking and more specifically to an multi-rate interface between a MAC layer and a PHY layer.

2. Background Art

In computer network systems there is typically a natural division between chips handling the physical layer, which is responsible for transmitting data on the network, and the system chips, which perform logical operations with data transmitted on the network. Each port in an Ethernet device is typically composed of a system chip, which includes a media access controller (MAC) layer or "MAC" and a physical (PHY) layer or "PHY". Most multi-port Ethernet devices integrate one or more MACs into one system chip (MAC chip) as well as one or more PHYs into another chip (PHY chip). An interface is required on each chip to transfer signals between the MACs and the PHYs.

IEEE standard 802.3 standards define protocols for interfaces between a MAC layer and a PHY for specific known data rate on a backplane link. However, if the data rate on a backplane link to a PHY is variable then there is lack of an interface that can support the variable data rate. Methods and systems are needed to overcome the above deficiencies.

BRIEF SUMMARY OF THE INVENTION

The invention comprises a method and system for a multi-rate Media Access Control layer (MAC) to Physical layer (PHY) interface. The method to provide a multi-rate Media Access Control layer (MAC) interface comprises receiving a first set of signals, sampling the first set of signals to determine a type of interface to be used to transmit or receive the first set of signals or a subset of the first set of signals, generating a select signal indicating type of interface to be used based on the sampling step and transmitting the first set of signals or a subset of the first set of signals using the interface indicated by the select signal. The method further comprises generating a third signal indicating data rate of the first set of signals to a MAC layer.

A method to provide a multi-rate Physical layer (PHY) interface is also described. The method comprises receiving a select signal from a Physical layer (PHY) indicating data rate of a first set of signals, selecting a first interface and turning off the second interface if the select signal indicates the first interface is to be used, selecting the second interface and turning off the first interface if the select signal indicates the second interface is to be used and transmitting the first set of signals using the first interface or a subset of the first set of signals using the second interface based on the select signal.

A multi-rate Media Access Control layer (MAC) interface is also provided. The interface comprises a first interface configured to transmit and receive a first set of signals from a Physical layer (PHY) and generate a first signal indicating whether the first set of signals correspond to the first interface, a second interface configured to transmit and receive the first set of signals from the (PHY) interface and generate a second signal indicating whether the first set of signals correspond to the second interface. The interface also comprises an auto-detect module coupled to the first and second interfaces and configured to generate a third signal indicating the type of interface to be used and a mux coupled to the first interface, the second interface, the auto-detect unit and configured to transmit the first set of signals using the first interface or a subset of the first set of signals using the second interface based on the third signal.

A multi-rate Physical layer (PHY) interface is also provided. The multi-rate PHY interface comprises a first interface configured to transmit and receive a first set of signals from a Media Access Control (MAC) interface and a second interface configured to transmit and receive the first set of signals from the MAC interface. The PHY interface also includes a mux coupled to the first interface, the second interface and configured to transmit the first set of signals or a subset of the first set of signals to or from a PHY layer based on a select signal received from a PHY layer.

In an embodiment, the type of interface is one of 10 Gigabit Attachment Unit Interface (XAUI) or Serial Gigabit Media Independent Interface (SGMII).

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

The present invention provides a multi-rate interface between a MAC and PHY layers, and applications thereof.

Methods and systems are provided for a multi-rate MAC to PHY interface that is enabled to utilize a 10 Gbps Attachment Unit Interface (XAUI) protocol for 10 Gbps link connections and a Serial Gigabit Media Independent Interface (SGMII) protocol for 10/100/1000 Mbps link connections by using one set of interface signals. A combined interface that can operate on either the XAUI or SGMII protocol eliminates an extra set of pins that a MAC chip and PHY chip would require if interfaces for both XAUI and SGMII protocols are separately implemented. In another aspect of the invention, the need for the MAC to read registers in the PHY to determine what speed the interface between MAC and PHY needs to run at is avoided.

In an embodiment, the multi-rate interface comprises a PHY interface, a MAC interface and lanes coupling the MAC interface to the PHY interface. The interface speed is unknown until the line/cable side or "backplane link" of the PHY has negotiated the desired rate with its link partner. Once this negotiation has taken place the PHY layer switches the PHY interface to the desired standard, XAUI or SGMII, where upon the MAC layer either detects XAUI signals or the negotiated rate through SGMII and switches the MAC interface accordingly. Through the use of parallel detecting the differences between the SGMII protocol and the XAUI protocol, the combined multi-rate interface is automatically configured to match the speed of the link connection.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

In Ethernet design, MAC and PHY layer protocols are typically implemented on two distinct micro-chips mounted on a circuit board. An interface is required between the MAC chip and the PHY chip. The interface is dependent on rate of operation of the PHY, which in turn is dependent on the speed of the backplane link of the Ethernet network.

Figure 1A:
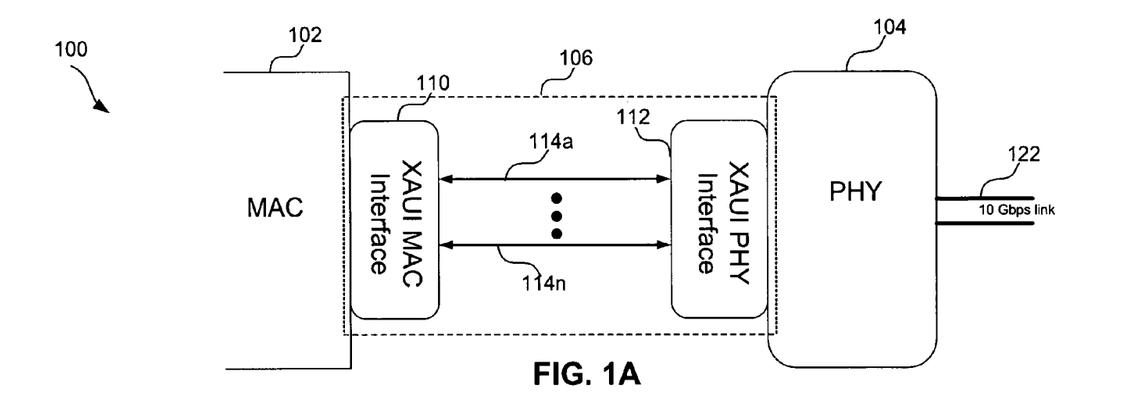
FIG. 1A illustrates an example 10 Gbps interface between a MAC and a PHY.

FIG. 1A illustrates a system 100 with an example 10 Gbps Attachment Unit Interface (XAUI) 106. In this example, backplane link 122 is a 10 Gbps signal. XAUI interface 106 includes a XAUI MAC interface 110, XAUI PHY interface 112 and four transmit/receive lanes 114a-n, each running at 3.125 Gbit/s using 8 B/10 B encoding. XAUI interface 108 is designed to the IEEE 802.3ae 10 Gbit Ethernet specification. XAUI is typically used as a 16-pin replacement for the 72-pin 10 Gigabit Medium-Independent Interface (XGMII). In an alternate embodiment, interface 106 may operate according to XGMII protocol to route 10 Gbps signals between MAC 102 and PHY 104. In yet another embodiment, interface 106 is a 10 Gigabit Serial Electrical Interface (XFI). XFI provides a single lane running at 10.3125 Gbit/s with a 64 B/66 B encoding scheme.

Figure 1B:
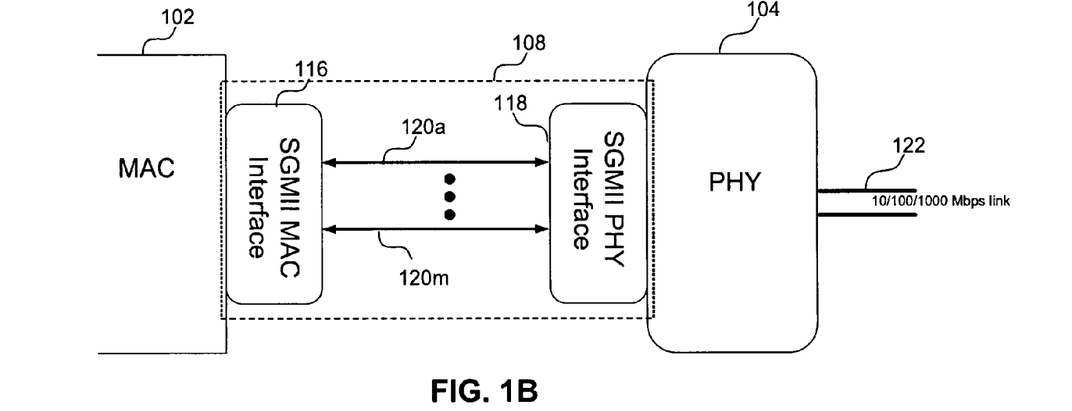
FIG. 1B illustrates an example 10/100/1000 Mbps interface between a MAC and a PHY.

FIG. 1B illustrates a system 100 with an example SGMII interface 108 between MAC layer 102 and PHY layer 104. In this example, backplane link 122 carries a 10/100/1000 Mbps signal. Interface 108 comprises SGMII MAC interface 116, SGMII PHY interface 112 and transmit/receive lanes 114a-n. SGMII is a standard 10/100/1000 Mbps protocol used to connect a MAC to a PHY. SGMII is typically used for Gigabit Ethernet, as opposed to Media Independent Interface (MII) which is used for 10/100 Mbps Ethernet. SGMII interface 108 uses a double data rate technology enabling an effective rate of 1.25 Gbaud between MAC 102 and PHY 104. In this format, eight pins are allocated to four channels with one pair each for receiving data and clock signals and one pair each for transmitting data and clock signals. Backplane link 122 determines the rate at which PHY 104 operates.

Figure 1C:
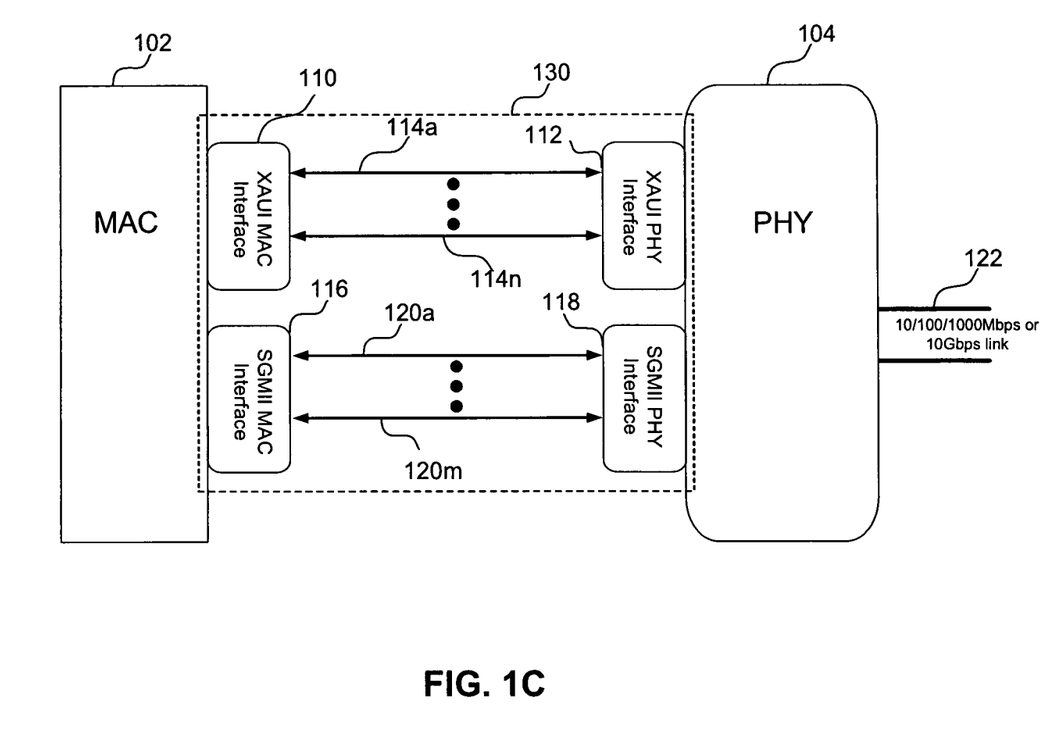
FIG. 1C illustrates an interface that includes XAUI and SGMII.

FIG. 1C illustrates an interface 130 that includes both a XAUI interface 106 and a SGMII interface 108. With current definition for MAC to PHY interfaces, a distinct SGMII interface 108 is required if link 122 resolves to a 10/100/1000 Mbps speed and a distinct XAUI interface is required if link 122 resolves to a 10 Gbps speed. However, as seen in FIG. 1C, implementing distinct interfaces for both SGMII and XAUI protocols significantly increases the number of pins and lanes on limited chip and printed circuit board (PCB) real estate. Furthermore, the conventional means for determining whether SGMII interface 108 or XAUI interface 106 is to be used is to read internal management registers of PHY 104.

With a multi-rate PHY 104 that can support both 10/100/1000 Mbps and 10 Gbps speeds, there is a need for a single interface between MAC 102 and PHY 104 that can support both SGMII and XAUI protocols while utilizing minimum number of lanes between MAC 102 and PHY 104. Embodiments presented below provide a multi-rate MAC to PHY interface that supports both SGMII and XAUI protocols.

EXAMPLE EMBODIMENTS

Figure 2A:
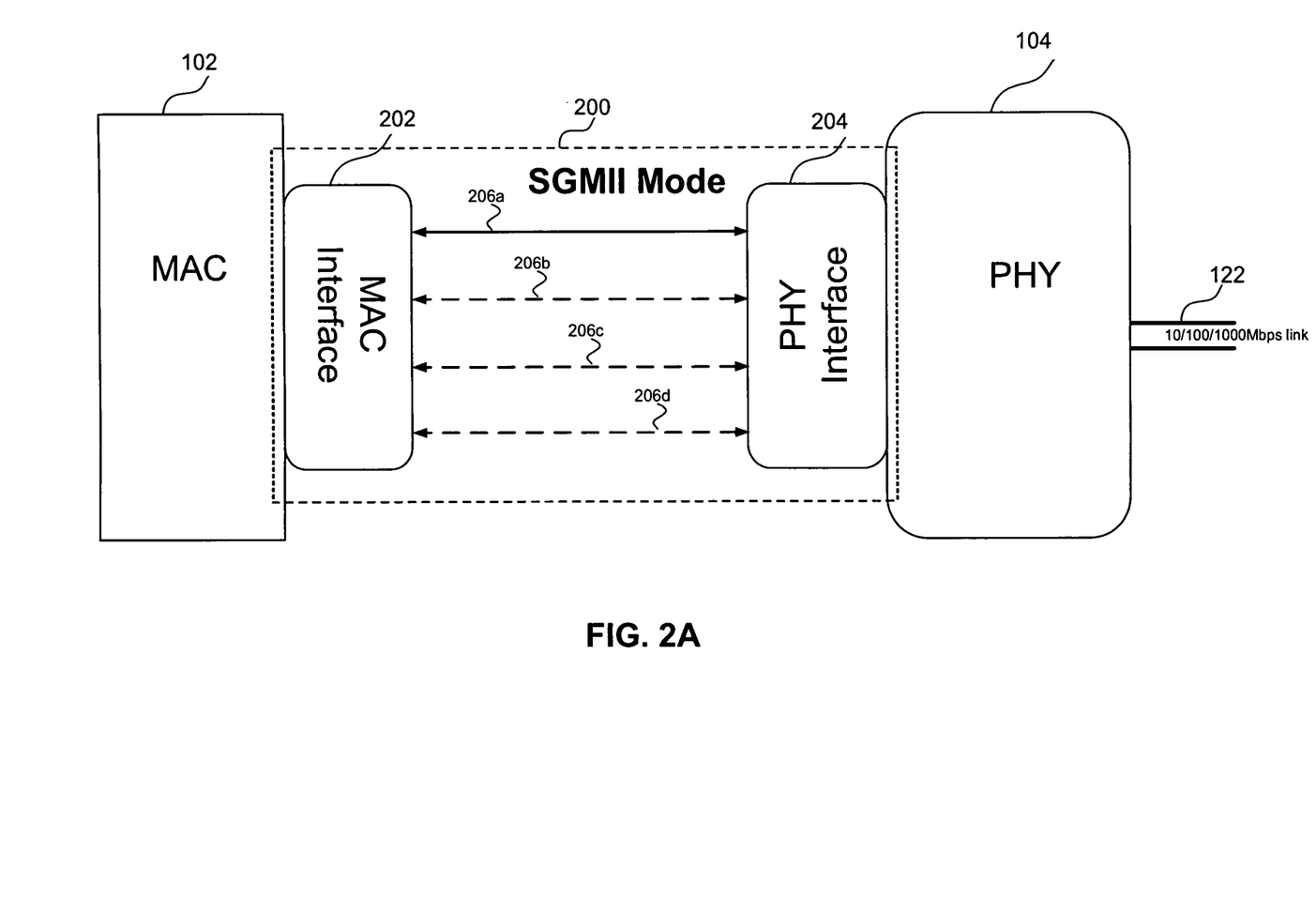
FIG. 2A illustrates a multi-rate interface for between a MAC and a PHY in a first mode of operation according to an embodiment of the invention.
Figure 2B:
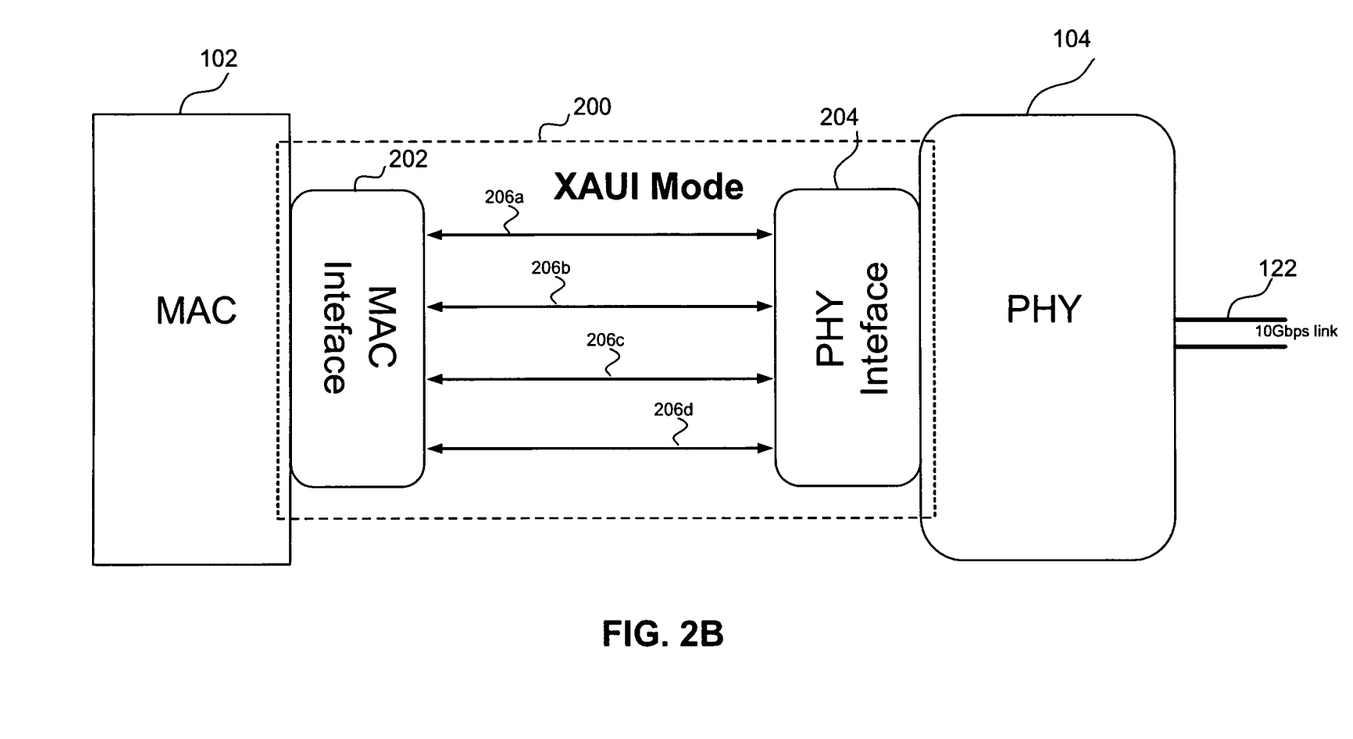
FIG. 2B illustrates a multi-rate interface between a MAC and a PHY in a second mode of operation according to an embodiment of the invention.

FIG. 2A illustrates a multi-rate interface 200 operating in SGMII mode according to an embodiment of the invention. Interface 200 includes MAC interface 202, PHY interface 204 and lanes 206a-d. Each of signal 206 includes a transmit lane and a receive lane. Interface 200 is a XAUI interface modified to support SGMII mode in addition to XAUI mode. In an embodiment, during startup, PHY 104 sets PHY interface 204 to transmit in SGMII mode using signal 206a. MAC 102 parallel detects SGMII signal on lane 206a and also sets MAC interface 202 to SGMII mode on lane 206a. Lanes 206b-d are inactive and propagate no signals. In this example, backplane link 122 resolves to a 10/100/1000 Mbps rate and interface 200 remains in SGMII mode. PHY 104 passes control information to MAC 102 via standard SGMII auto-negotiation. FIG. 2B described below illustrates the case where link 122 resolves to a 10 Gbps rate.

FIG. 2B illustrates multi-rate interface 200 operating in XAUI mode according to an embodiment of the invention. In the present example, backplane link 122 resolves to a 10 Gbps speed. PHY 104 is enabled to detect a 10 Gbps signal on backplane 122. PHY interface 202 is in SGMII mode upon startup as described above with reference to FIG. 2A. Upon detecting a 10 Gbps signal on link 122, PHY 104 switches PHY interface 204 from SGMII mode to XAUI mode and transmits/receives on all four lanes 206a-d. MAC 102 is enabled to parallel detect XAUI signals, set MAC interface 202 to XAUI mode and transmit/receive on all four lanes 206a-d.

In an alternate embodiment, during startup, PHY interface 204 is automatically set to XAUI mode on lanes 206a-d. MAC 102 parallel detects XAUI signals on lanes 206a-d and also sets MAC interface 202 to XAUI mode. If backplane link 122 resolves to a 10/100/1000 Mbps rate, PHY 102 switches PHY interface 204 to SGMII mode on lane 206a and lanes 206b-d are rendered inactive. MAC 102 parallel detects SGMII signal and sets MAC interface 202 to SGMII mode on lane 206a while rendering lanes 204b-d inactive. Interface 200 may be referred to as a 10 Gbps Serial Media Independent Interface (XGSMII).

Figure 3A:
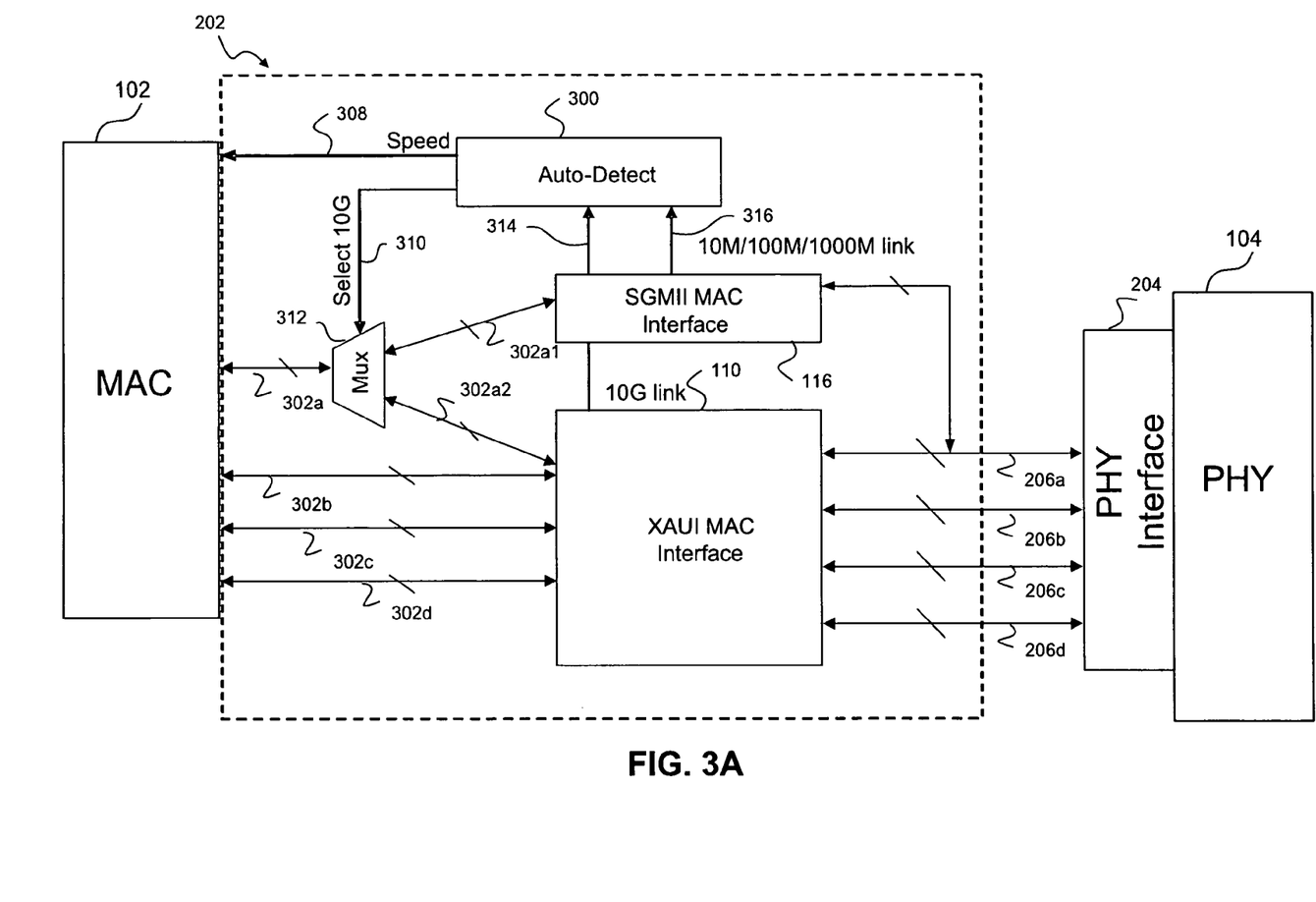
FIG. 3A illustrates MAC interface in further detail according to an embodiment of the invention.

FIG. 3A illustrates MAC interface 202 in further detail according to an embodiment of the invention.

MAC interface 202 includes auto-detect module 300, SGMII MAC interface 116, XAUI MAC interface 110 and mux 312. Auto-detect module 300 is coupled to mux 312, SGMII MAC interface 116, XAUI MAC interface 110 and MAC 102. Mux 312 is coupled to auto-detect module 300, SGMII MAC interface 116, XAUI MAC interface 110 and MAC 102. XAUI MAC interface 110 is coupled to PHY interface 204, mux 312, auto-detect module 300 and MAC 102. SGMII MAC interface 116 is coupled to PHY interface 204, auto-detect module 300, mux 312 and MAC 102.

Mux 312 transmits and receives signals 302a to/from MAC 102. Mux 312 transmits and receives signal 302a1 to/from SGMII MAC interface 116. Mux 312 also transmits and receives signal 302a2 to/from XAUI MAC interface 110. Auto-detect module 300 is configured to generate select signal 310 which is fed to mux 312. Auto-detect module 300 is also configured to generate signal 308 which is sent to MAC 102. XAUI MAC interface 110 is configured to generate signal 314 which is fed to auto-detect module 300. SGMII MAC interface 116 is configured to generate signal 316 which is fed to auto-detect module 300. XAUI MAC interface transmits and receives signals 206 to/from PHY interface. SGMII MAC interface 116 transmits and receives signal 206a to/from PHY interface 204.

Upon detecting a signal on one of lanes 206 from PHY interface 204, XAUI MAC interface 110 and SGMII MAC interface 116 sample the link to determine whether XAUI or SGMII is to be used. XAUI MAC interface 110 is configured to generate signal 314 indicating whether XAUI mode is to be used. SGMII MAC interface 116 is configured to generate signal 316 indicating to auto-detect module 300 whether SGMII mode is to be used. Signal 316 is also used to indicate whether the connections speed of link 206 is 10 Mbps, 100 Mbps or 1000 Mbps.

Auto-detect module 300 is configured to, based on signals 314 and 316, determine whether XAUI or SGMII is to be used for signal 206. Auto detect module 300 is enabled to generate signal 308 which indicates SGMII 10 Mbps, 100 Mbps or 1000 Mbps speed or XAUI 10 Gbps speed to MAC 102.

Auto-detect module 300, based on signals 314 and signals 316 generates a select signal 310 which is sent to mux 312. Select signal 310 indicates whether SGMII mode or XAUI mode is in use. Based on select signal 310, mux 312 routes either signal 302a1 from SGMII MAC interface 116 or signal 302a2 from XAUI MAC interface 110 to MAC 102. In SGMII mode, only signal 302a is transmitted and the remaining lanes 302b-d are inactive. In XAUI mode, mux 312 selects signal 302a2 to be routed to 302a and lanes 302b-d are also active. Signals 302a-d correspond to signals 206 received from PHY interface 204.

Figure 3B:
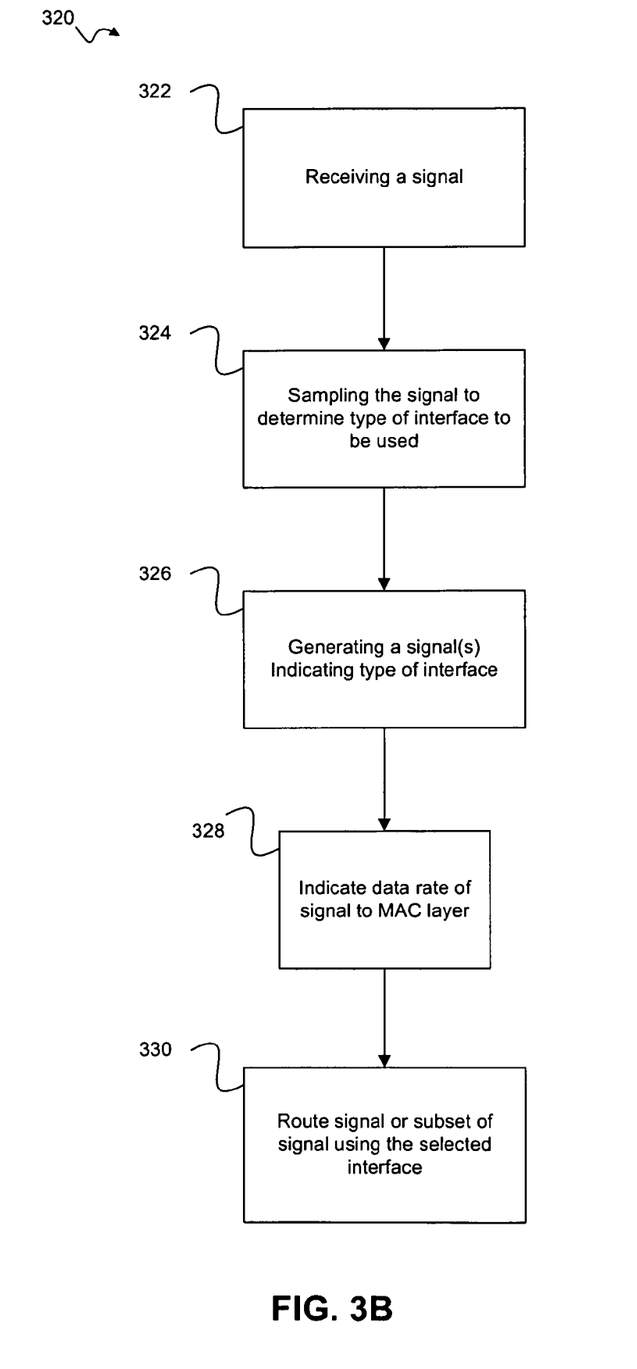
FIG. 3B illustrates a flowchart showing steps performed by a MAC interface according to an embodiment of the invention.

FIG. 3B illustrates a flowchart 320 showing steps performed by MAC interface 202 according to an embodiment of the invention. Flowchart 320 will be described with reference to the example operating environment illustrated in FIG. 3A. In an embodiment, steps 320 are performed by MAC interface 202. However, the flowchart is not limited to that embodiment. Note that some steps shown in flowchart 320 do not necessarily have to occur in the order that is shown.

In step 322, a signal is received from PHY interface 204. For example, MAC interface 202 receives signal 206 from PHY interface 104.

In step 324, the signal received in step 322 is sampled to determine the type of interface to be used to transmit and receive the signal from step 322. For example, SGMII MAC interface 116 and XAUI MAC interface 110 sample signal 206 received in step 322.

In step 326, one of SGMII or XAUI interfaces generate a signal to indicate whether they have linked with the signal received in step 322. For example, XAUI MAC interface 110 generates signal 314 to indicate to auto-detect module 300 whether it has linked with signal 206. SGMII MAC interface 116 is configured to generate signal 316 to indicate to auto-detect module 300 whether it has linked with signal 206.

In step 328, the link speed of the signal received in step 322 is indicated to a MAC layer. For example, auto-detect module 300 indicates the speed of link 206 to MAC 102 via signal 308.

In step 330, based on the signals received from SGMII and XAUI interfaces in step 326, a signal is generated to select either SGMII mode or XAUI mode. For example, based on signal 314 received from XAUI MAC interface 110 and signal 316 received from SGMII MAC interface 116, auto-detect module 300 is configured to generate a signal 310 which is used by mux 312 to route either signal 302a1 from SGMII MAC interface 116 onto 302a or route signals 302a2 from XAUI MAC interface 110 to MAC 102. In SGMII mode, only lane 302a is active and in XAUI mode, lanes 302a-d are active.

Figure 4A:
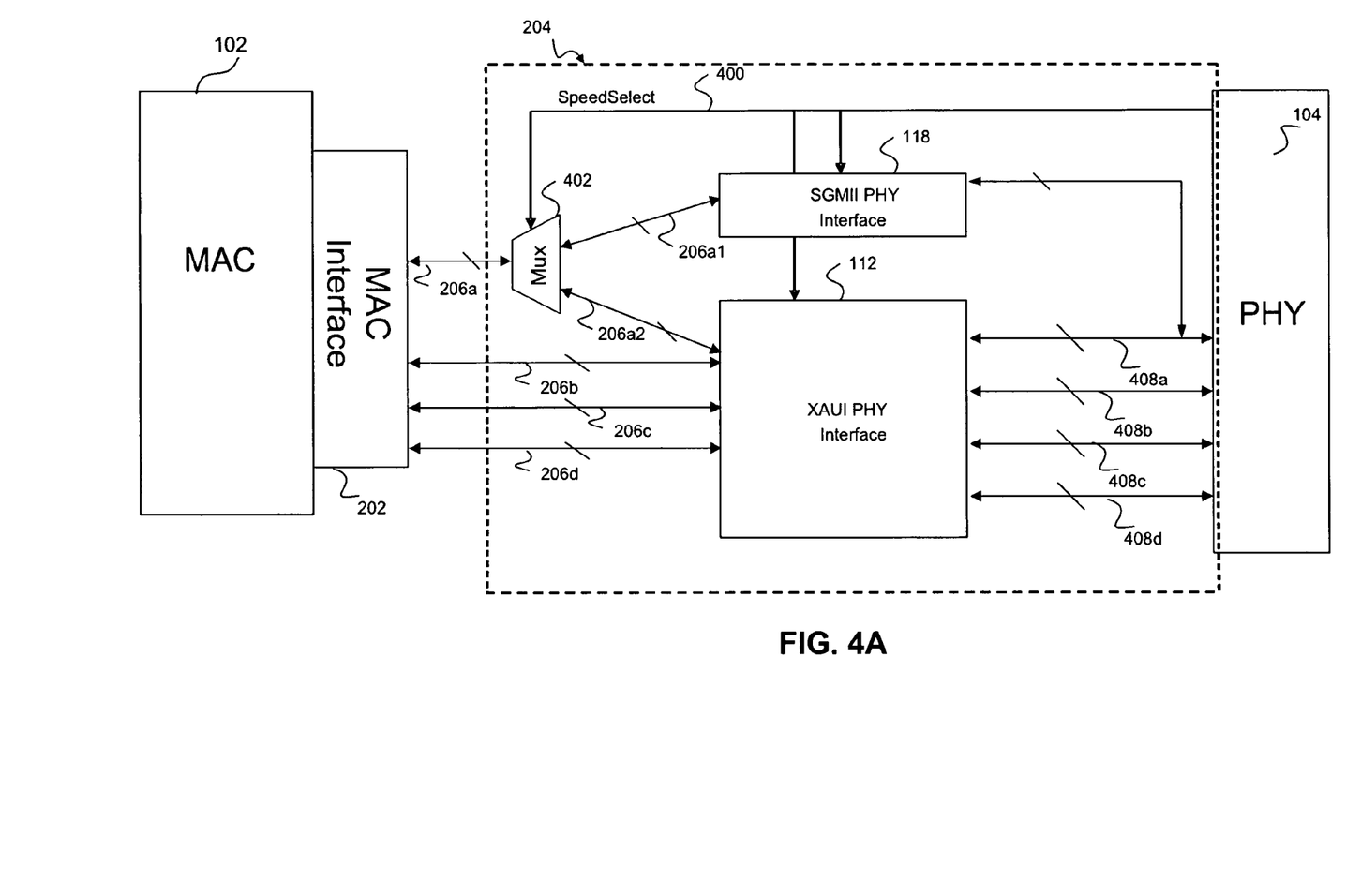
FIG. 4A illustrates a PHY interface in further detail according to an embodiment of the invention.

FIG. 4A illustrates PHY interface 204 in further detail according to an embodiment of the invention.

PHY interface 204 comprises SGMII PHY interface 118, XAUI PHY interface 112 and mux 402. Mux 402 is coupled to MAC interface 202, PHY 104, SGMII PHY interface 118 and XAUI PHY interface 112. SGMII PHY interface 118 is coupled to mux 402 and PHY interface 104. XAUI PHY interface 112 is coupled to PHY interface 104 and mux 402. XAUI PHY interface 112 is configured to transmit/receive signals 206b-d and 206a2 and SGMII PHY interface 118 is configured to transmit/receive signal 206a1 both of which are fed to mux 402. Mux 402 is configured to transmit/receive signals 206a. Mux 402 selects either signals 206a1 or signal 206a2 to be transmitted onto signal 206a based on speed select signal 400. SGMII PHY interface 118 and XAUI PHY interface 112 transmit and receive signals 408 to/from PHY layer 104. Signals 408 are derived from backplane link 122.

PHY 104 generates signal 400 to indicate whether a 10 Mbps/100 Mbps/1000 Mbps data rate (SGMII mode) or a 10 Gpbs data rate (XAUI mode) is selected. If signal 400 indicates SGMII mode then, XAUI PHY interface 112 is turned off and mux 402 receives and transmits signals 206a1 onto signal 206a and lanes 206b-d are inactive. If signal 400 indicates XAUI mode to be used, then SGMII PHY interface 118 is turned off and mux 402 receives and transmits signal 206a2 onto signal 206a. Lanes 206b-d are active and transmit signals in XAUI mode.

Figure 4B:
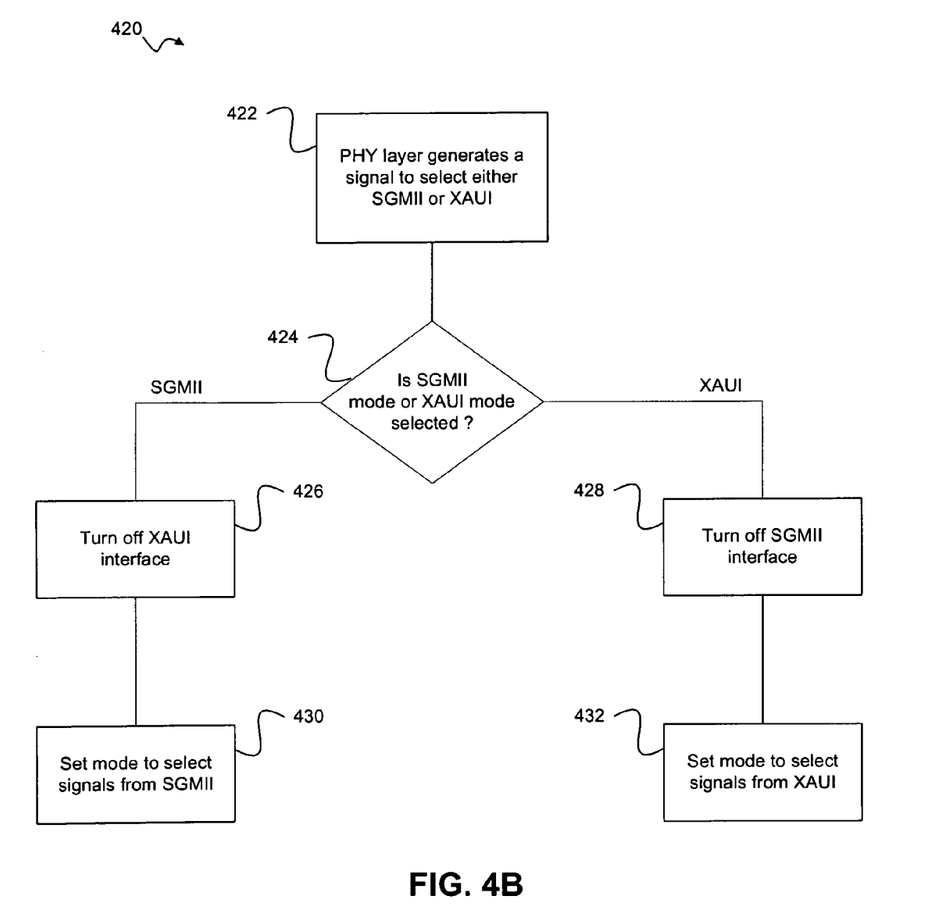
FIG. 4B illustrates a flowchart showing steps performed by a PHY interface according to an embodiment of the invention.

FIG. 4B illustrates a flowchart 420 showing steps performed by PHY interface 204 according to an embodiment of the invention. Flowchart 420 will be described with reference to the example operating environment illustrated in FIG. 4A. However, the flowchart is not limited to that embodiment. Note that some steps shown in flowchart 420 do not necessarily have to occur in the order that is shown.

In step 422, a signal is generated to select either SGMII or XAUI transmission mode. For example, PHY layer 104 generates select signal 400 to select either SGMII or XAUI mode.

In step 424, it is determined whether SGMII or XAUI mode has been selected. For example, based on signal 400, SGMII interface 118, XAUI interface 112 and mux 402 determine whether SGMII or XAUI mode is selected.

If SGMII mode is selected then control proceeds to step 426. If XAUI mode is selected then control proceeds to step 428.

In step 426, based on the signal generated in step 422, a XAUI interface is turned off. For example, based on signal 400 XAUI PHY interface 112 is turned off.

In step 430, based on the signal received in step 422 the mux is set to select signals from the SGMII interface. For example, based on signal 400, mux 402 selects signal 206a1 from SGMII PHY interface 118 to transmit and receive to/from MAC interface 202. Lanes 206b-d are inactive.

In step 428, based on the signal received in step 422, a SGMII interface 118 is turned off. For example, SGMII PHY interface 118 is turned off based on signals 400.

In step 432, mux 402 is set to select signals from the XAUI interface. For example, based on signal 400, mux 402 selects signal 206a2 from XAUI PHY interface 112 to transmit and receive to/from MAC interface 202. Lanes 206b-d are also active in XAUI mode.

ALTERNATE EMBODIMENTS

In an alternate embodiment, interface 200 supports SGMII and XFI modes. In yet another embodiment, interface 200 may support SGMII and 10 GBASE-KR mode. It is to be appreciated that the number of lanes, data rates and protocols used are a design choice and arbitrary.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method to provide a multi-rate Media Access Control (MAC) layer interface utilizing a shared set of communication lanes, the method comprising:
 receiving a first set of signals;
 sampling the first set of signals using a first MAC layer interface that corresponds to a first data rate and generating a first signal indicating whether the first set of signals correspond to the first MAC layer interface;
 sampling the first set of signals using a second MAC layer interface that corresponds to a second data rate and generating a second signal indicating whether the first set of signals correspond to the second MAC layer interface;
 generating a select signal indicating a mode from a plurality of modes to be used based on the first signal and the second signal; and
 transmitting the first set of signals using the first MAC layer interface or a subset of the first set of signals using the second MAC layer interface based on the mode indicated by the select signal;
 wherein each of the plurality of modes use the same shared set of communication lanes;
 wherein a first mode uses at least one communication lane of the shared set of communication lanes and a second mode uses the at least one communication lane of the first mode in addition to one or more additional communication lanes of the shared set of communication lanes; and
 wherein the first mode corresponds to the first data rate and the second mode corresponds to the second data rate that is higher than the first data rate.

2. The method of claim 1, wherein the mode is one of 10 Gigabit Attachment Unit Interface (XAUI) or Serial Gigabit Media Independent Interface (SGMII).

3. The method of claim 2, wherein the first set of signals is transmitted using XAUI and a subset of the first set of signals is transmitted using SGMII.

4. The method of claim 1, further comprising generating a third signal indicating a data rate of the first set of signals to a MAC layer interface.

5. The method of claim 1, wherein the sampling step further comprises generating a second signal that indicates if a 10 Gigabit Attachment Unit Interface (XAUI) has linked with the first set of signals.

6. The method of claim 1, wherein the sampling step further comprises generating a third signal that indicates if a Serial Gigabit Media Independent Interface (SGMII) has linked with the first set of signals and if a data rate of the first set of signals is one of 10 Mbps, 100 Mbps or 1000 Mbps.

7. A method to provide a multi-rate Physical (PHY) layer interface, the method comprising:
 receiving a select signal from a PHY layer interface that is based on a data rate of a first set of signals;
 selecting a first PHY layer interface associated with a first mode and a first data rate and turning off a second PHY layer interface associated with a second mode and a second data rate if the select signal indicates the first mode is to be used;
 selecting the second PHY layer interface and turning off the first PHY layer interface if the select signal indicates the second mode is to be used; and
 transmitting the first set of signals using the first PHY layer interface or a subset of the first set of signals using the second PHY layer interface based on the select signal;
 wherein said first mode uses at least one communication lane to transfer data at the first data rate and said second mode uses the at least one communication lane of the first mode in addition to one or more additional communication lanes to transfer data at the second data rate, and wherein the second data rate is higher than the first data rate.

8. The method of claim 7, wherein the type of PHY layer interface is one of 10 Gigabit Attachment Unit Interface (XAUI) or Serial Gigabit Media Independent Interface (SGMII).

9. The method of claim 7, wherein the first mode and the second mode are not used simultaneously.

10. A multi-rate Media Access Control (MAC) layer interface, comprising:
 a first MAC layer interface corresponding to a first data rate configured to transmit a first set of signals from a Physical (PHY) layer interface and generate a first signal indicating whether the first set of signals correspond to the first MAC interface;
 a second MAC interface corresponding to a second data rate configured to transmit a subset of the first set of signals from the PHY layer interface and generate a second signal indicating whether the first set of signals correspond to the second MAC layer interface, wherein the first MAC layer interface detects the first data rate and the second MAC layer interface detects the second data rate;

an auto-detect module coupled to the first and second MAC layer interfaces and configured to generate a third signal indicating the type of MAC layer interface to be used based on the first signal and the second signal; and a mux coupled to the first MAC layer interface, the second MAC layer interface, the auto-detect module and configured to transmit the first set of signals using the first MAC layer interface or a subset of the first set of signals using the second MAC layer interface based on the third signal;

wherein the first MAC layer interface includes at least one communication lane and the second MAC layer interface includes the at least one communication lane of the first interface in addition to one or more additional communication lanes; and wherein the second data rate is higher than the first data rate.

11. The multi-rate MAC layer interface of claim 10, wherein the second MAC layer interface is a Serial Gigabit Media Independent Interface (SGMII) MAC layer interface and the first MAC layer interface is a 10 Gigabit Attachment Unit Interface (XAUI) MAC layer interface.

12. The multi-rate MAC layer interface of claim 10, wherein the auto-detect module is further configured to generate a fourth signal indicating the data rate of the first set of signals.

13. The multi-rate MAC layer interface of claim 10, wherein the first MAC layer interface generates a fourth signal that indicates the data rate of the first set of signals to be one of 10 Mbps, 100 Mbps or 1000 Mbps.

14. A multi-rate Physical (PHY) layer interface, comprising:

a first interface configured to receive a select signal from the PHY layer interface indicating whether a first set of signals correspond to the first interface and transmit the first set of signals from a Media Access Control (MAC) layer interface;

a second interface configured to receive the select signal from the PHY layer interface indicating whether the first set of signals correspond to the second interface and transmit a subset of the first set of signals from the MAC layer interface; and a mux coupled to the first interface and the second interface and configured to transmit the first set of signals or the subset of the first set of signals to or from the MAC layer interface based on the select signal received from the PHY layer interface;

wherein said first interface includes at least one communication lane and said second interface includes the at least one communication lane of the first interface in addition to one or more additional communication lanes; and wherein the first interface corresponds to a first data rate and the second interface corresponds to a second data rate that is higher than the first data rate.

15. The multi-rate PHY layer interface of claim 14, wherein the second interface is a Serial Gigabit Media Independent Interface (SGMII) PHY layer interface and the first interface is a 10 Gigabit Attachment Unit Interface (XAUI) PHY layer interface.

16. The multi-rate PHY layer interface of claim 15, wherein the first set of signals is transmitted using XAUI and a subset of the first set of signals is transmitted using SGMII.

17. The multi-rate PHY layer interface of claim 14, wherein the PHY layer interface indicates a data rate of the first set of signals to the MAC layer interface.

18. The multi-rate PHY layer interface of claim 14, wherein the select signal indicates if a 10 Gigabit Attachment Unit Interface (XAUI) has linked with the first set of signals.

* * * * *